United States Patent [19]

Kamimori et al.

[11] 4,435,048
[45] Mar. 6, 1984

[54] ELECTRO-OPTICAL DEVICE AND ELECTRO-OPTICAL LIGHT CONTROLLING DEVICE

[75] Inventors: Tadatoshi Kamimori, Tokyo; Mamoru Mizuhashi; Junichi Nagai, both of Yokohama, all of Japan

[73] Assignee: Asahi Glass Company Ltd., Tokyo, Japan

[21] Appl. No.: 254,104

[22] Filed: Apr. 14, 1981

[30] Foreign Application Priority Data

Apr. 15, 1980 [JP] Japan ................... 55-48657
Apr. 18, 1980 [JP] Japan ................... 55-50324
Nov. 6, 1980 [JP] Japan ................... 55-155213

[51] Int. Cl.$^3$ ........................ H01G 9/00; G02F 1/17
[52] U.S. Cl. ........................ 350/357; 252/62.2
[58] Field of Search ................ 252/62.2; 350/357

[56] References Cited

U.S. PATENT DOCUMENTS

| | | | |
|---|---|---|---|
| 3,453,038 | 7/1969 | Kissa | 350/357 |
| 4,231,641 | 11/1980 | Randin | 350/357 |
| 4,285,575 | 8/1981 | Imataki | 350/357 |
| 4,332,440 | 6/1982 | DiDomenico | 350/357 |

*Primary Examiner*—John F. Niebling
*Attorney, Agent, or Firm*—Oblon, Fisher, Spivak, McClelland & Maier

[57] ABSTRACT

An electro-optical device comprising an electrolyte layer held between a pair of electrodes and an electrochromic material placed on at least one of said electrodes, wherein said electrolyte layer comprises an organic material and a chelating agent and an electro-optical light controlling device comprising an electrolyte layer held between a pair of transmissive electrodes and an electrochromic material placed on at least one of said electrodes; wherein said electrolyte layer comprises a non-liquid material of an adhesive or tacky high polymer and a material having coordinating function to a metal.

9 Claims, 72 Drawing Figures

ELECTRO-OPTICAL DEVICE AND ELECTRO-OPTICAL LIGHT CONTROLLING DEVICE

BACKGROUND OF THE INVENTION

1. Field of the Invention

The present invention relates to an electro-optical device using an electrochromic material having electrochromic phenomenon and an electro-optical light controlling device using an adhesive or tacky high polymer as an electrolyte capable of light-controlling a large area.

2. Description of the Prior Arts

Electro-optical devices utilizing the electrochromic phenomenon have been developed in practical applications for display devices (e.g., watches etc.) in view of their excellent contrast and as light controlling devices for automatically controlling incident sun light or artifical light in windows of buildings, vehicles, ships, and airplanes.

Heretofore, it has been known to prepare an electro-optical device which comprises an electrochromic material of $WO_3$, $MoO_3$, $TiO_2$ or $Ir_2O_3$ and an electrolyte layer containing an ion for coloring the electrochromic material which is held between a pair of electrodes. It has been mainly studied to apply the devices to small size displays.

Solid, liquid and semisolid electrolytes have been proposed as the electrolytes used in the devices. In large area usage requiring a satisfactory percent transmission modulation, these solid electrolytes cause slow response, have a narrow modulation range, and are in a form of multi coated layers with a low productivity. Moreover, it is difficult to give uniform characteristics in a large area. The use of liquid electrolytes for large areas cause difficulty in panel preparation and inhibition of leakage of the electrolyte.

It has been proposed to use a gel electrolyte as the semisolid electrolyte, in Japanese Patent Publication No. 43387/1979 wherein polyvinyl alcohol, polyacrylamide, ethyleneglycol, sodium silicate, silica gel and glycerine with sulfuric acid etc. are disclosed. However, this gel lacks tackiness whereby it is difficult to prepare a device having a large area. Moreover, there are difficulties of durability and handling since a high concentration of sulfuric acid is used.

The use of polystyrene, polyethylene, sulfonic acid and perfluorosulfonic acid are disclosed in G. B. Pat. No. 2,005,856, however, these also lack adhesiveness whereby it is difficult to prepare a large panel. The use of copolymers of a vinyl monomer and a comonomer are disclosed in G. B. Pat. No. 2,014,326, however, these electrolytes contain a high content of water whereby there are difficulties of adhesiveness and durability.

SUMMARY OF THE INVENTION

It is an object of the present invention to provide an electro-optical device and an electro-optical light controlling device having excellent response characteristics at low voltage.

It is another object of the present invention to provide an electro-optical light controlling device having a large area and durability and being capable of controlling percent transmission in broad region. The other object of the present ivention is to provide an electro-optical light controlling device imparting uniform color density variation in a large area. The further object of the present invention is to provide an electro-optical light controlling device improving a response velocity for coloring and bleaching for a large area to a satisfactory level for a practical application.

The foregoing and other objects of the present invention have been attained by providing the followings.

An electro-optical device comprising an electrolyte layer held between a pair of electrodes and an electrochromic material placed on at least one of said electrodes, wherein said electrolyte layer comprises an organic material and a chelating agent.

An electro-optical light controlling device comprising an electrolyte layer held between a pair of transmissive electrodes and an electrochromic material placed on at least one of said electrodes, wherein said electrolyte layer comprises a non-liquid material of an adhesive or tacky high polymer and a material having coordinating function to a metal.

DETAILED DESCRIPTION OF THE PREFERRED EMBODIMENTS

Figure 1:
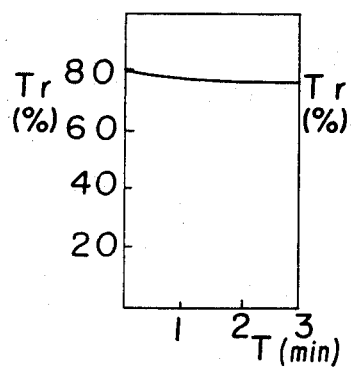
FIGS. 1 to 72 respectively graph coloring and bleaching characteristics of the samples in the examples and references.
Figure 2:
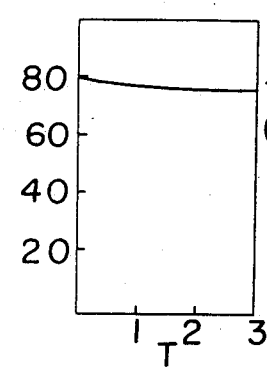
Figure 3:
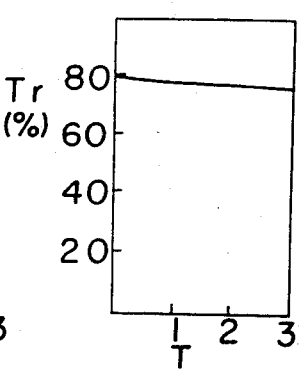
Figure 4:
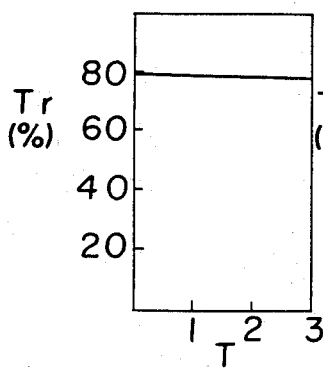
Figure 5:
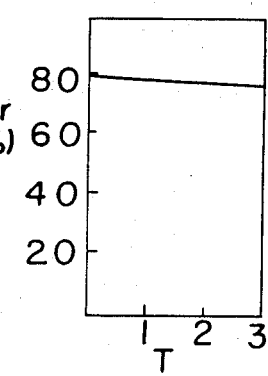
Figure 6:
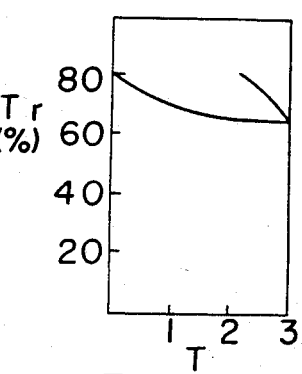
Figure 7:
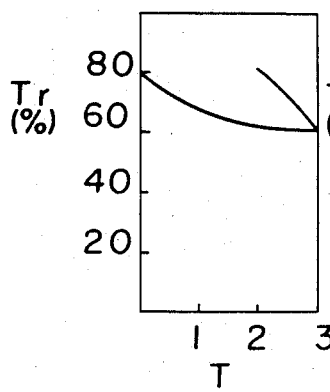
Figure 8:
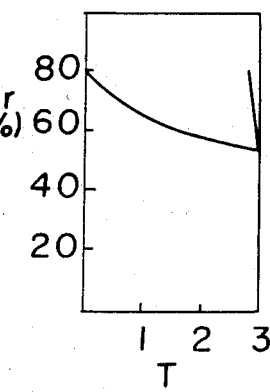
Figure 9:
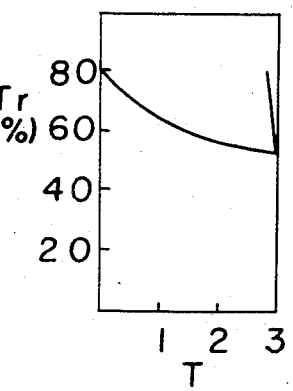
Figure 10:
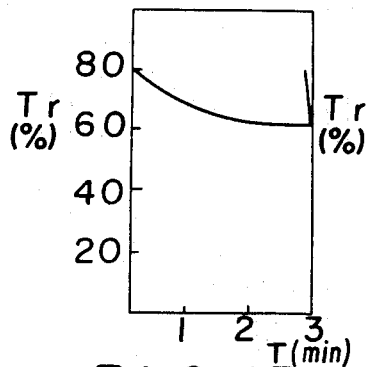
Figure 11:
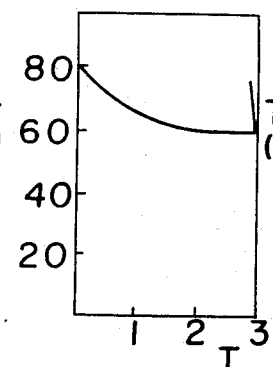
Figure 12:
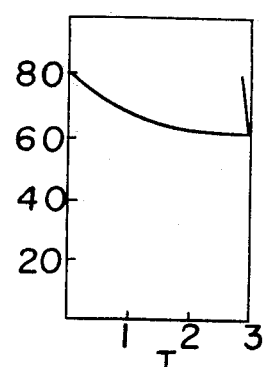
Figure 13:
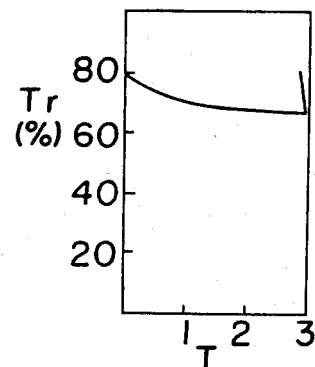
Figure 14:
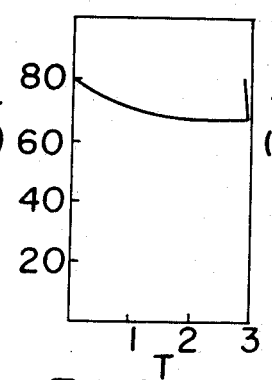
Figure 15:
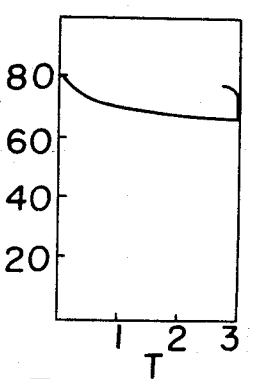
Figure 16:
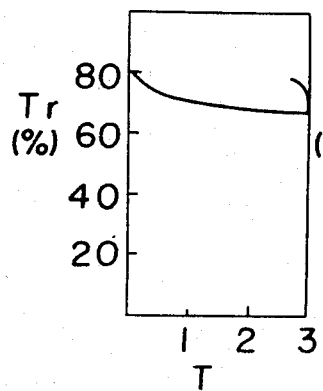
Figure 17:
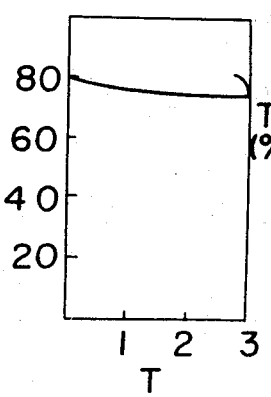
Figure 18:
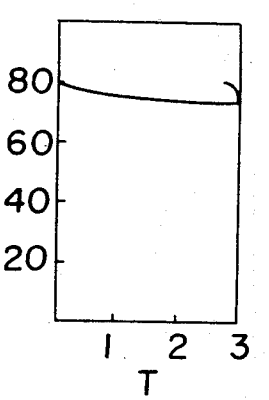
Figure 19:
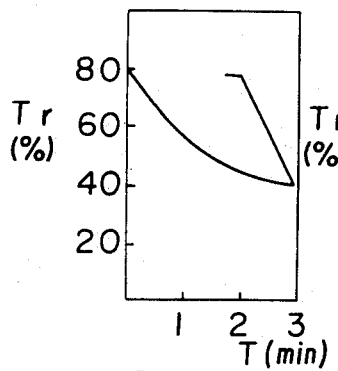
Figure 20:
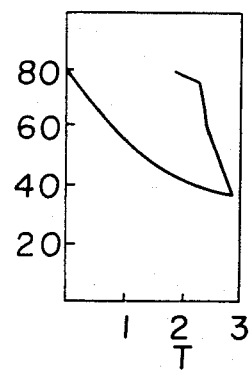
Figure 21:
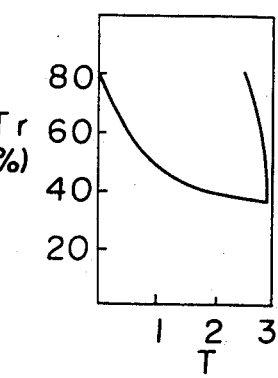
Figure 22:
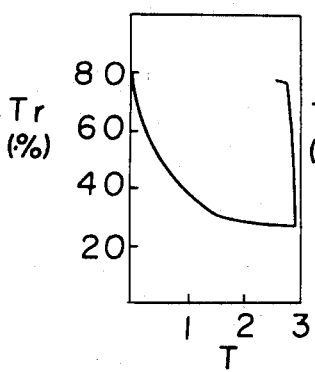
Figure 23:
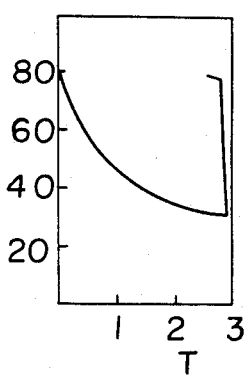
Figure 24:
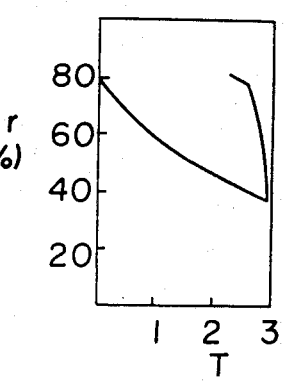
Figure 25:
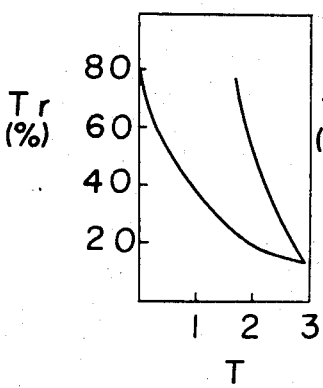
Figure 26:
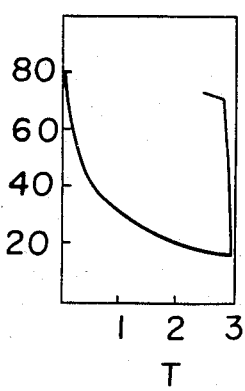
Figure 27:
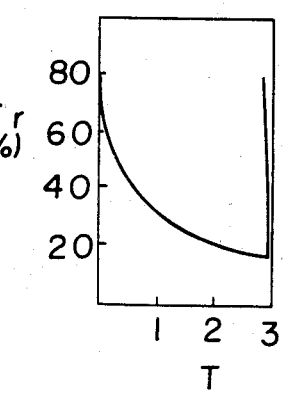
Figure 28:
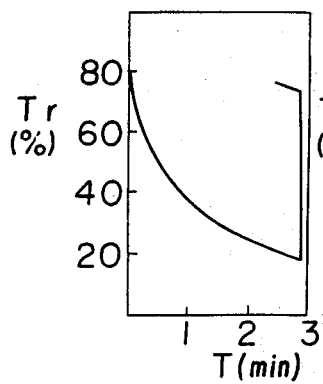
Figure 29:
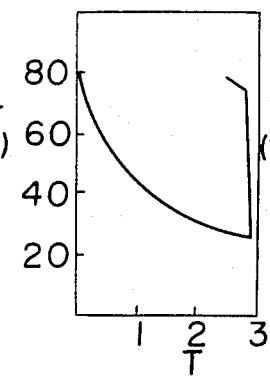
Figure 30:
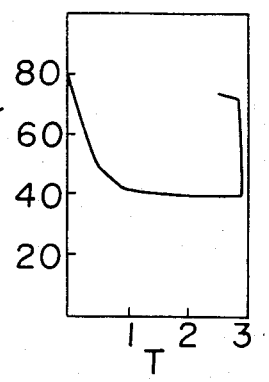
Figure 31:
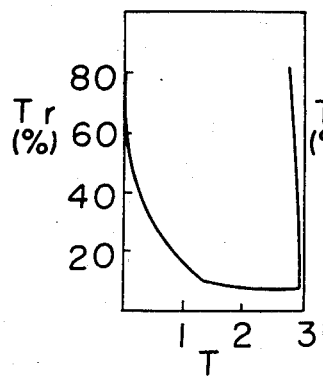
Figure 32:
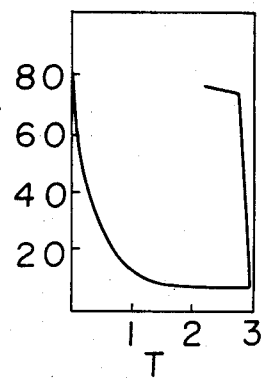
Figure 33:
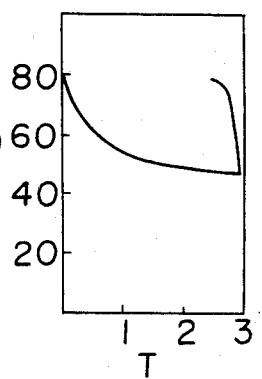
Figure 34:
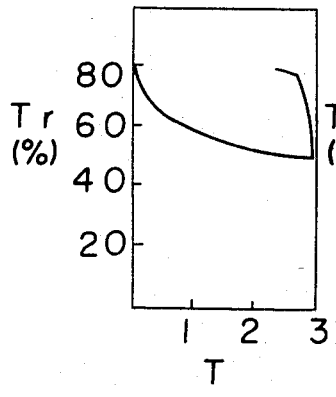
Figure 35:
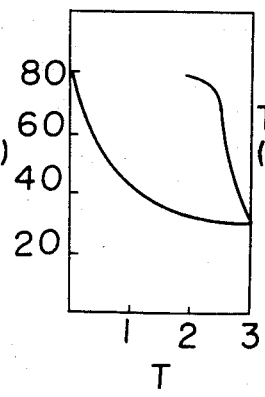
Figure 36:
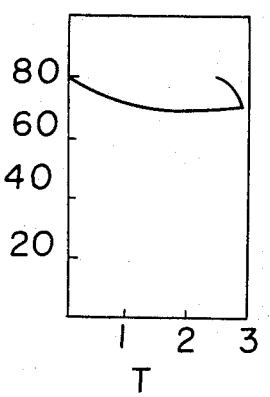
Figure 37:
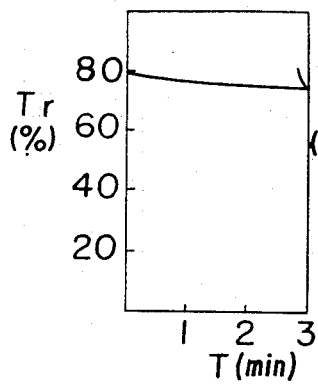
Figure 38:
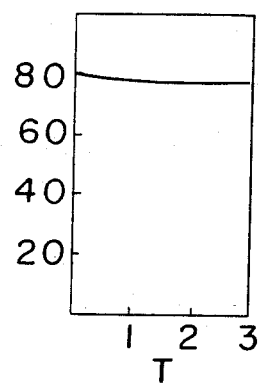
Figure 39:
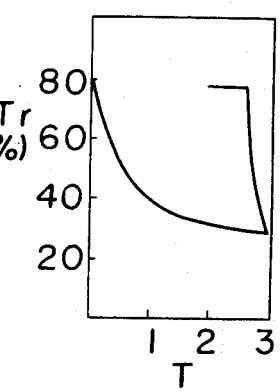
Figure 40:
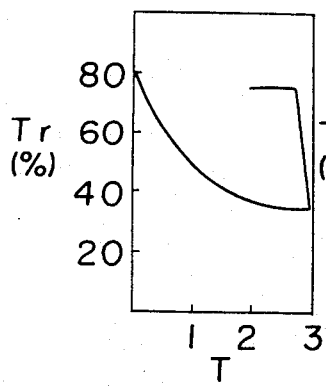
Figure 41:
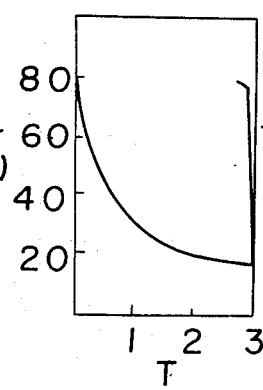
Figure 42:
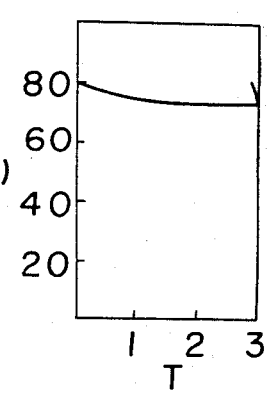
Figure 43:
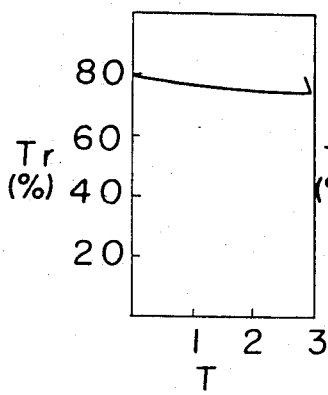
Figure 44:
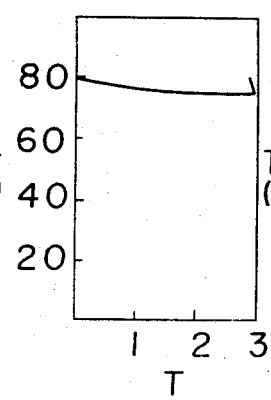
Figure 45:
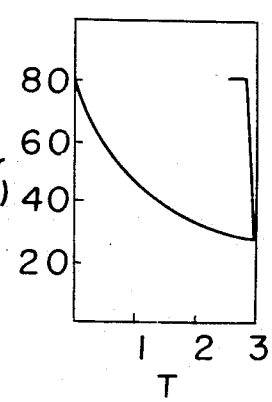
Figure 46:
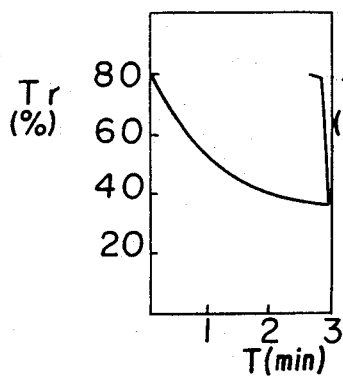
Figure 47:
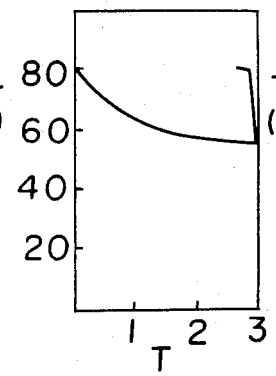
Figure 48:
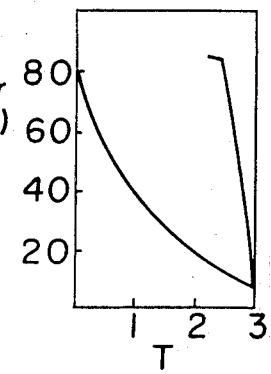
Figure 49:
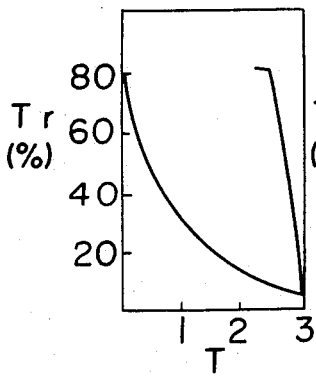
Figure 50:
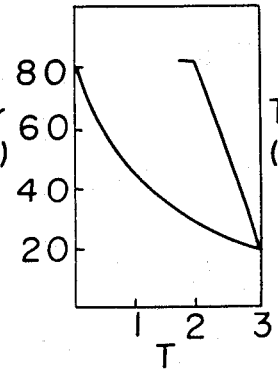
Figure 51:
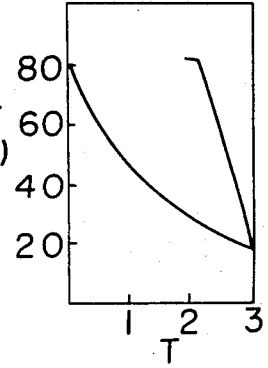
Figure 52:
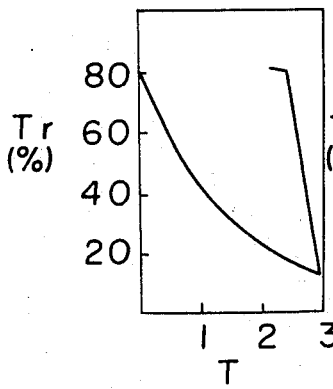
Figure 53:
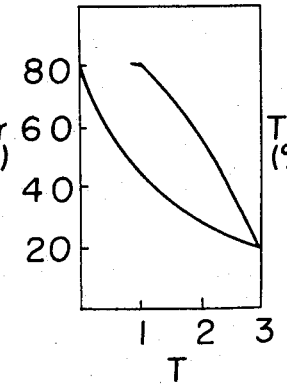
Figure 54:
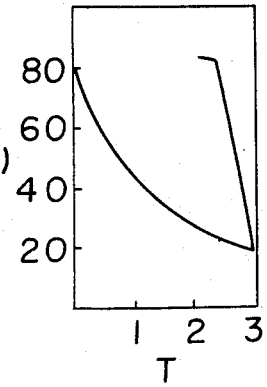
Figure 55:
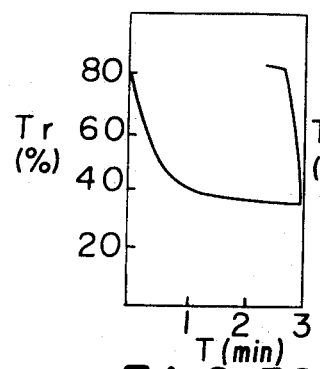
Figure 56:
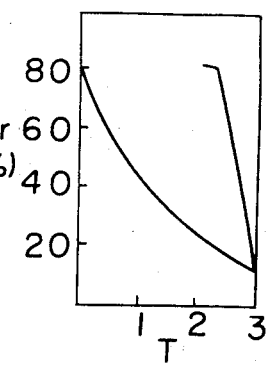
Figure 57:
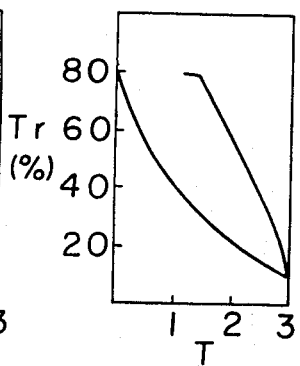
Figure 58:
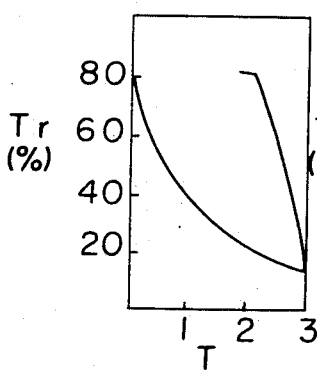
Figure 59:
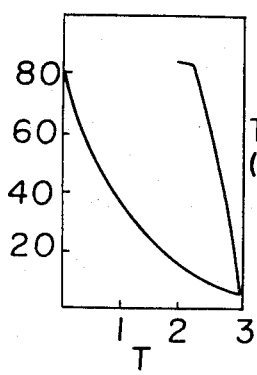
Figure 60:
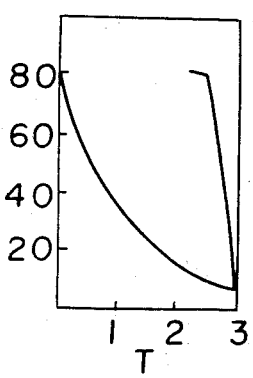

An electrode used in the present invention comprises a substrate having an electrode layer. An electroconductive layer made of $In_2O_3$, $SnO_2$, Au etc. is formed on a substrate made of a glass, a plastic etc. The electroconductive layer can be usually placed on all part of one surface of the substrate in the case of an electro-optical light controlling device. The electroconductive layer can be partially placed or divided into plural parts in a display device.

In detail, the electroconductive material such as $In_2O_3$, $SnO_2$, $Cd_2SnO_4$ etc. as a main component is placed on a transparent substrate such as glass plate, polyester film and plastic substrate of polycarbonate or polymethacrylate etc. A vacuum evaporation method, a sputtering method, a CVD method, a spraying method, a CLD method etc. can be applied in the case of the glass plate. A magnetron sputtering method, an ion-plating method, an ion beam sputtering method and other method in which a temperature of the substrate need not raise too high to form a layer having a thickness of about 500 to 2,000 Å, can be applied in the case of a plastic substrate.

In the case of an electro-optical light controlling device, a transparent substrate is used as the substrate and a transparent electrode layer is used on both substrates. In the case of a display device, a substrate in back side can be opaque and an electrode in back side i.e. a counter electrode can be opaque. The electrochromic material layer is formed on an electroconductive layer of one of the electrodes. A thickness of the electrochromic material layer is selected depending upon a color density in coloring and is usually in a range of 1,000 to 10,000 Å.

The electroconductive layer of the other electrode is used as a counter electrode. In the case of the light controlling device, an electrochromic material layer which does not absorb in the visible region in both coloring and bleaching can be used. In the case of the display device, a desired electrochromic material can be used.

The electrochromic materials used in the present invention can be the above-mentioned known materials and is usually selected from $WO_3$ type materials. The electrochromic material has absorbability in the visible region in coloring but has no absorption in the visible region in bleaching. It is usually preferable to use an electrochromic material which absorbs in all of the visible region in coloring to be opaque but is transparent in all of the visible region in bleaching. It is also possible to display special color patterns or symbols by using an electrochromic material which absorbs at a special wavelength or by using a color filter.

The electrolyte layer of the present invention comprises an organic material and a material having coordinating function to a metal. In a large size light controlling device, the organic material is preferably a liquid material containing an adhesive or tacky high polymer. The electrolyte layer preferably comprises a chlorine-containing lower carboxylic acid or a bromine compound as a bleaching stabilizer, and also preferably comprises an iodine compound for improving low voltage actuation characteristics.

The material having coordinating function to a metal improves the color responding characteristics. It is considered that certain coordination is formed by the ligand to the electrode metal to make easy movement of electric charge on an electrode whereby the responsiveness is improved. The materials having coordinating function to a metal can be neutral molecules or anions of elements in Group of VB, VIB or VIIB of the periodic table such as $NR_3$, $PR_3$, $S=CR_2$, $O=CR_2$ (R:H, alkyl group, phenyl group or other organic group), $NH_2^-$, $F^-$ and $CN^-$. The color responsiveness can be improved by the materials in certain degree. Among then, various chelating agent as multi-coordinate ligands are especially effective.

The chelating agents can be $\beta$-diketone derivatives such as acetyl acetone and benzoyl acetone; polyamines such as ethylenediamine, and triethylenetetraamine; oximes such as dimethylglyoxime; polycarboxylic acids such as oxalic acid, maleic acid and ethylenediamine tetraacetic acid; aminoacids such as glycine, and sulfur containing compounds such as thioglycolic acid, thiosalicylic acid and dimercaptopropanol.

The color accelerators (the materials having coordinating function to a metal) impart their effect at a concentration of $5\times10^{-3}$ mol/liter to saturation. When it is less than $5\times10^{-3}$ mol/liter, the improvement of the responsiveness is not enough whereas when it is more than the saturated content, a precipitation is disadvantageously caused.

The responsiveness especially, the color responsiveness is improved by incorporating the additive itself, and it is further improved by incorporating a material for increasing a concentration or mobility of a proton ion or ion together with the additive.

The materials for increasing a concentration or mobility of a proton ion can be inorganic acids such as sulfuric acid, hydrochloric acid and phosphoric acid; organic carboxylic acids such as formic acid, acetic acid, benzoic acid and trichloroacetic acid; organic sulfonic acid such as benzenesulfonic acid and toluenesulfonic acid; organic bases such as LiOH and NaOH; organic bases such as n-propylamine; transition metal salts such as chromium acetate, nickel sulfate, iron chloride; organic salts such as ammonium acetate; fine oxide particles or solutions $SiO_2$, $Al_2O_3$ or $TiO_2$.

Among the materials for improving the responsiveness, the following bleaching stabilizers are especially suitable because the bleaching function can be also improved.

The bleaching stabilizers can be chlorine-containing lower carboxylic acids and bromine compounds which improve percent transmission in the transmissive state in bleaching. Suitable bleaching stabilizers include chlorine or bromine-containing carboxylic acids having up to 4 carbon atoms such as trichloroacetic acid, dichloroacetic acid, monochloroacetic acid, tribromoacetic acid, dibromoacetic acid, monobromoacetic acid, chloropropionic acid, bromopropionic acid, chlorobutyric acid and bromobutyric acid; alkyl bromides having upto 4 of carbon atoms such as tetrabromomethane, tribromomethane, dibromomethane, monobromomethane, bromomethane, bromopropane; aromatic bromo compounds such as bromobenzene, bromophenol, dibromoaniline and tribromobenzoic acid and bromopyridine.

The bleaching stabilizer inhibits a spontaneous coloring of the counter electrode to yellow or brown with a concomittant relatively higher potential of the $WO_3$ side. When the bleaching stabilizer is incorporated at a concentration of $1\times10^{-3}$ mol/liter to a saturated concentration, the reduction of ITO electrode in bleaching is decreased to decrease the potential whereby a complete bleaching is attained without the spontaneous coloring of $WO_3$. This mechanism is not clearly understood, but destabilization and separation of the chelating agent on the ITO electrode surface is considered to give the observed result.

In the present invention, it is preferable to incorporate an iodine compound for decreasing the driving voltage.

The iodine compounds can be iodine and metal iodides such as lithium iodide, sodium iodide, manganese iodide, cobalt iodide, iron iodide, nickel iodide, zinc iodide and aluminum iodide; iodides such as ammonium iodide; iodine-containing carboxylic acid having up to 4 of carbon atoms such as monoiodoacetatic acid; alkyl iodides having up to 4 of carbon atoms such as monoiodomethane, triiodomethane and iodoethane; and aromatic iodo compounds such as iodobenzene, iodoaniline and iodothioxybenzene.

The iodine compound is incorporated in a range of $5\times10^{-3}$ mol/liter to saturated concentration to decrease the driving voltage of electrochromic light controlling device. When the iodine compound is combined with the bleaching stabilizer, the effects of the responsiveness, the low voltage driving property, the electrode deterioration inhibition and life prolong effect are improved.

When the content of the iodine compound is less than $5\times10^{-3}$ mol/liter, improvement is not substantially found; whereas when it is more than the saturated content, a precipitate is disadvantageously caused. The content is selected as desired in the range. When the iodine compound is combined with a coloring accelerator, the response characteristic at low voltage is especially improved and the memory characteristic is satisfactory.

The oganic electrolyte layers used for the electrolyte layer are not critical and usually comprise a proton conductive solvent as a main component.

The protone conductive solvents used in the present invention are preferably solvents having a high boiling point, a low solidification point and a large dielectric constant such as alcohols having at least 3 of carbon atoms, amide type solvents and propylene-carbonate.

The organic electrolytes used in the present invention can be high polymers having an adhesive or tacky function to an electrode in view of a large area.

Suitable high polymers(macromolecular compounds) include polyacrylic acid, polymethacrylic acid and their salts, esters or amides; and polysulfonic acid, polyvinyl alcohol, polyvinyl acetate, polyvinyl acetal, nylon, polyurethane, melamine, urea resins, and polyaminosilane and copolymers of the monomer thereof and comonomers which have polar groups and adhesiveness.

Since the high polymer having adhesive or tacky function is used as the electrolyte, the electrolyte layer can be in a semisolid form whereby the difficulties in a peripheral sealing, an inlet sealing and a constant spacing can be substantially overcome. Moreover, two electrodes are adhered by the electrolyte layer whereby it is advantageously safe without scattering of broken pieces even though the electrode-substrates are broken by a strong shock.

The polyvinyl acetals as polyvinyl butyral impart excellent adhesiveness, durability and response characteristic and impart excellent durability in a large area and both of the light controlling function and the safety function. When the semisolid electrolyte is used, the peripheral sealing of the device and the inlet sealing are remarkably simpler than the conventional device using a liquid electrolyte and sometimes needless whereby disadvantages such as a deterioration caused by a liquid leakage and an enlargement of a space caused by bending of transparent substrates can be prevented and excellent safety is expected.

In the light controlling device of the present invention, the high polymer is used. When the high polymer is soluble in the solvent, a solution of the organic electrolyte containing the additives is coated on an electrode layer to a desired thickness by a meniscus coating method, a pulling up method, a spraying method, a spreading method or a spinner method and the coated layer is press-bonded to an electrode having an electrochromic material layer formed by a vacuum evaporation. If the high polymer can be in a film form, a film of the high polymer containing the additives is prepared and is pressed between both electrode plates.

When the high polymer is not soluble in a solvent, the additives are incorporated in a monomer and a curing agent is also incorporated to give a desired viscosity and the viscous solution is used. In the press-bonding, it is possible to apply a heat or a pressure if necessary.

It is also possible to incorporate a desired plasticizer, a viscosity improver, a stabilizer, a filler or a pigment in order to improve handling in the coating and press-bonding.

In order to give a constant space between the electrode plates, a plastic film, a glass fiber or glass beads of a constant thickness can be placed in the peripheral part or in the surface.

The counter electrode can be only an electroconductive layer, however, the response characteristic at low voltage can be improved by forming a thin layer made of a transition compound such as transition metal oxides, nitrides or sulfides. It is especially effective to form a thin layer of FeO, NiO or CuO.

The device is prepared by assembling the electrode plates and the organic electrolyte layer.

In the case of a transmissive display device, transparent substrates and transparent electrodes are used in both sides. In the case of a reflective display device, a known porous background plate made of $Al_2O_3$ or a fluorinated resin is placed between both electrode substrates.

In the case of a liquid electrolyte, a pair of electrode plates are sealed with a sealant and the electrolyte is charged in the cell and the inlet is sealed. The sealants can be known sealants such as epoxy resins, fluorinated resins, silicone resins, glass frits etc. which do not adversely affect to the electrochromic material or the electrolyte in the curing step or the application.

When the electrolyte is a non-liquid composition comprising a high polymer, the electrolyte layer can be placed on the electrode plate. The end surfaces of the electrode plates are preferably sealed by coating a sealant such as epoxy resins, silicone resins, butyl rubber and polysulfide rubber to prevent a penetration of moisture or oxygen.

It is also possible to prepare the device as the liquid electrolyte device, by preparing a cell and charging a liquid monomer and sealing the inlet before the curing.

In the application of the device of the present invention, the glass, a hard plastic or a hard coated plastic is used as the substrate for electrode and the device can be used as a light controlling window for a building or a vehicle.

A flexible electro-optical device can be prepared by using a flexible plastic film as the substrate for electrode. The device can be placed in a laminated glass by bonding it on the glass plate. The bonding type electro-optical device which can be bonded to a substrate can be prepared by forming an abrassion resistant coating on the surface of the plastic film.

The coloring and bleaching mechanism of the electrochromic material will be illustrated.

The coloring and bleaching mechanism of the electrochromic material is a reversible reaction as shown by the following equation in the case of $WO_3$.

The reaction equilibrium shifts to the right, as written when the display electrode is negative to cause coloring whereas the reaction equilibrium shifts to the left, as written when the display electrode is positive, to cause bleaching. The device using the electrochromic material has a memory characteristic. When the display electrode is in a floating state, the immediately preceding condition is maintained for a relatively long period whereby power consumption is minimized.

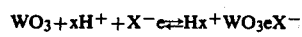

As the outer electrode, $In_2O_3$, is used when the counter electrode is positive to corresponding to the display electrode, the reaction equilibrium shifts to the right direction; Ke represents a chelating agents.

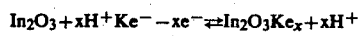

The iodine compound used in the present invention is effective to decrease the driving voltage. The mechanism is not clearly understood and accordingly it is not shown in the reactions. Thus, when the iodine compound is combined with the coloring accelerator, the driving voltage can be remarkably decreased whereby the device may be actuated by about 1 Volt.

The present invention will be further illustrated by certain examples and references which are provided for purposes of illustration only and are not intended to limit the present invention.

EXAMPLES AND REFERENCES

In the examples and references, each coloring electrode plate was prepared by a vacuum evaporation of $In_2O_3$ on a glass plate and a vacuum evaporation of $WO_3$ on the $In_2O_3$ layer. A counter electrode plate was prepared by a vacuum evaporation of $In_2O_3$ on a glass plate.

When a high polymer was used as the electrolyte layer, the high polymer was held between pair of the electrode plates as a binder, under a pressure by gripping the electrode plates for 1 day to prepare each sample. When a liquid electrolyte was used, peripheral parts of the electrode plates were sealed with a resin to prepare each cell and the liquid electrolyte was charged and the inlet was sealed to prepared each sample. The effective area of the sample was in 3 cm×3 cm. Terminals were connected to the electrodes of each sample to apply a voltage between the electrodes and each coloring and bleaching response characteristic (percent transmission (Tr: %)-response time (T: min) was measured.

The results are shown in graphs wherein each ordinate is for the percent transmission (100%) and each ascissa is for time (minute) and each left curve of the graph shows a variation of the percent transmission for coloring in the application of the voltage for 3 minutes and each right curve of the graph shows a variation of the percent transmission for bleaching in the application of a voltage having reverse polarity at zero minute. When the curve is discontinued, the interruption of the voltage is shown. The reference numerals of the graphs correspond to the test numbers.

Tests 1 to 7

High polymers were respectively used as the electrolyte layer without an additive as references. The kinds of high polymers and voltages applied are shown in Table 1.

TABLE 1

| Sample No. | High polymer | Voltage (V) |
|---|---|---|
| 1 | 30% dimethylformamide solution of polyvinyl alcohol | 2 |
| 2 | 30% isopropyl alcohol solution of polyacrylic acid | 2 |
| 3 | 30% toluene solution of polyvinyl acetate | 5 |
| 4 | 30% thinner solution of two liquid type urethane | 20 |
| 5 | 10μ nylon film | 30 |
| 6 | 30% isopropyl alcohol solution of polyvinyl butyral(butyral value of 63%) | 2 |
| 7 | 30% of isopropyl alcohol solution of polyvinyl butyral (butyral value of 70%) | 2 |

Samples No. 1 to No. 5 had not a substantial change in the percent transmission whereby these samples could not be used in transparent type display device nor in light controlling devices.

Samples No. 6 and No. 7 had slight coloring and bleaching change. The variation of the percent transmission is only from 80% to 60% and is thus unsatisfactory.

Tests No. 8 to 14

As the high polymer, 12.5% isopropyl alcohol solution of polyvinyl butyral (butyral value of 70%) was used and each electrolytes such as acids and salts was incorporated at a ratio of 10 wt. % based on polyvinyl butyral as a reference. The kinds of the additives and voltages applied are shown in Table 2.

TABLE 2

| Sample No. | Additive | Voltage (V) |
|---|---|---|
| 8 | hydrochloric acid | 2 |
| 9 | sulfuric acid | 2 |
| 10 | trichloroacetic acid | 2 |
| 11 | p-toluenesulfonic acid | 2 |
| 12 | ammonium acetate | 2 |
| 13 | lithium hydroxide | 2 |
| 14 | silica sol | 2 |

The additives were effective for improving the response characteristic. Samples No. 8 to No. 14 had effect for increasing the bleaching velocity over those of Samples No. 6 and No. 7, however the coloring degrees of the samples were not satisfactory. The additive of Sample No. 10 is the typical bleaching stabilizer however the addition of this additive did not give satisfactory results in practical applications.

Tests No. 15 to 18

The other high polymers beside polyvinyl butyral were respectively used as references. The kinds of high polymers, the additives, and voltages applied are shown in Table 3.

TABLE 3

| No. | High polymer | Additive | Voltage (V) |
|---|---|---|---|
| 15 | 30% ethanol solution of polyvinyl alcohol | sulfuric acid | 2 |
| 16 | 30% isopropyl alcohol solution of polyacrylic acid | sulfuric acid | 2 |
| 17 | 30% toluene solution of polyvinyl acetate | p-toluene-sulfonic acid | 5 |
| 18 | 30% thinner solution of urethane | p-toluene-sulfonic acid | 5 |

The samples were prepared by adding additives to improve the response characteristic. Samples No. 15 to No. 18 imparted only slightly deep colors but could not be practically used.

Tests No. 19 to 32

As the high polymer, 12.5% isopropyl alcohol solution of polyvinyl butyral (butyral value of 70%) was used and various additives were respectively incorporated and the devices were driven at a voltage of 2 V.

In Samples No. 19 to No. 25, material having a coordinating function to a metal was incorporated at a ratio of 10 wt. % based on polyvinyl butyral. The kinds of additives are shown in Table 4.

In Samples No. 26 to No. 32, the chelating agent and the other additive were respectively incorporated at each ratio of 5 wt. % based on polyvinyl butyral. The kinds of chelating agents and other additives are shown in Table 5.

TABLE 4

| Sample No. | Material having coordinating function |
|---|---|
| 19 | triphenylphosphine |
| 20 | thiourea |
| 21 | acetyl acetone |
| 22 | triethylenetetraamine |
| 23 | oxalic acid |
| 24 | dimethyl glyoxime |

TABLE 4-continued

| Sample No. | Material having coordinating function |
|---|---|
| 25 | thiosalicylic acid |

TABLE 5

| Sample No. | Chelating agent | Additive |
|---|---|---|
| 26 | acetyl acetone | hydrochloric acid |
| 27 | acetyl acetone | trichloroacetic acid |
| 28 | acetyl acetone | p-toluenesulfonic acid |
| 29 | acetyl acetone | silica sol |
| 30 | acetyl acetone | lithium hydroxide |
| 31 | thiosalicylic acid | tribromoacetic acid |
| 32 | thiosalicylic acid | sulfuric acid |

Samples No. 19 to No. 25 had improved coloring characteristics. The percent transmission in coloring was respectively less than 40% and the ratios of percent transmission in coloring and bleaching were respectively more than 2. Among the samples, Samples No. 25 using thiosalicylic acid had the percent transmission of about 20% in coloring.

Samples No. 26 to No. 32 contained each of the additives for improving the response characteristic. Samples No. 27 and No. 31 incorporating the bleaching stabilizer imparted rapid bleaching to the original state without a permanent coloring by repeating the coloring and bleaching.

Tests No. 33 to 37

The samples were prepared by using high polymers other than polyvinyl butyral and incorporating the chelating agents. The kinds of the high polymers, the chelating agents and the voltages applied are shown in Table 6.

TABLE 6

| Sample No. | High polymer | Chelating agent | Voltage(V) |
|---|---|---|---|
| 33 | 30% dimethylformamide solution of polyvinyl alcohol | salicylaldehyde 10 wt. % | 2 |
| 34 | 30% isopropyl alcohol solution of polyacrylic acid | oxalic acid 10 wt. % | 2 |
| 35 | 30% toluene solution of polyvinyl acetic acid | thiosalicylic acid 10 wt. % | 5 |
| 36 | 30% thinner solution of urethane | acetyl acetone 10 wt. % | 20 |
| 37 | 10μ nylon film | ethylene diamine 10 wt. % | 30 |

Samples No. 33 to 37 were formed by incorporating the chelating agents in the high polymers of Samples No. 1 to No. 5. The coloring characteristics were improved, but were inferior to those of Samples using polyvinyl butyral.

Tests No. 38 to 46

The samples were prepared by using butyl alcohol as the solvent without any high polymer and the devices were driven at a voltage of 2 V or 1.5 V.

The kinds of the chelating agents and the response improving additives are shown in Table 7.

TABLE 7

| Sample No. | Chelating agent | Additive | Voltage (V) |
|---|---|---|---|
| 38 | none | none | 2 |
| 39 | β-mercaptopropionic acid 0.1 M/liter | none | 1.5 |
| 40 | oxalic acid 0.1 M/liter | none | 2 |
| 41 | β-mercaptopropionic acid 0.1 M/liter | trichloroacetic acid 0.05 M/liter | 1.5 |
| 42 | none | trichloroacetic acid 0.05 M/liter | 1.5 |
| 43 | none | sulfuric acid 1 M/liter | 1.5 |
| 44 | none | lithium perchlorate 1 M/liter | 1.5 |
| 45 | oxalic acid 0.1 M/liter | trichloroacetic acid 0.05 M/liter | 2 |
| 46 | acetyl acetone 2 M/liter | trichloroacetic acid 0.05 M/liter | 2 |

Sample No. 38 comprising butyl alcohol without any additive did not impart the coloring characteristic. Samples No. 39 to 41 and No. 45 and No. 46 incorporating the chelating agent imparted good coloring characteristics. Samples No. 41, No. 45 and No. 46 incorporating trichloroacetic acid for bleaching effect as the additive, had excellent characteristics for deep coloring at a high bleaching velocity.

Tests 47 to 54

The samples were prepared by using butyl alcohol as the solvent, and incorporating thiosalicylic acid as a chelating agent at a ratio of 0.1 M/liter; and tribromoacetic acid as a bleaching stabilizer at a ratio of 0.05 M/liter and each of various iodine compound at a ratio of 0.1 M/liter and the devices were driven at a voltage of 1 V. The kinds iodine compounds are shown in Table 8.

TABLE 8

| Sample No. | Iodine compound |
|---|---|
| 47 | none |
| 48 | iodine |
| 49 | lithium iodide |
| 50 | manganese iodide |
| 51 | nickel iodide |
| 52 | zinc iodide |
| 53 | ammonium iodide |
| 54 | monoiodoacetic acid |

Sample No. 47 which did not contain any iodine compound imparted excellent bleaching stability at 2 V but imparted only slight coloring at 1 V. On the other hand, Sample No. 48 to No. 54 respectively imparted deep coloring at 1 V.

Tests No. 55 to 60

The samples were prepared by using butyl alcohol as a solvent and incorporating lithium iodide as the iodine compound at a ratio of 0.1 M/liter and the chelating agent at a ratio of 0.1 M/liter and the bleaching stabilizer at a ratio of 0.05 M/liter and the devices were driven at a voltage of 1 V. The kinds of chelating agents and the bleaching agents are shown in Table 9.

TABLE 9

| Sample No. | Chelating agent | Bleaching stabilizer |
|---|---|---|
| 55 | none | tribromoacetic acid |
| 56 | thiosalicylic acid | dibromoacetic acid |
| 57 | thiosalicylic acid | tribromomethane |

TABLE 9-continued

| Sample No. | Chelating agent | Bleaching stabilizer |
|---|---|---|
| 58 | mercaptoethanol | tribromoacetic acid |
| 59 | 2,3-dimethyl mercaptopropanol | tribromoacetic acid |
| 60 | β-mercaptopropionic acid | tribromoacetic acid |

Sample No. 55 did not contain any chelating agent and had inferior characteristic to those of Sample No. 56 to No. 60. When Sample No. 55 was kept in the floating state, the percent transmission was returned to about 50% after 2 hours and was completely returned after 5 hours. On the contrary, Samples No. 56 to No. 60 impart deep coloring even though a low voltage of only 1 volt was applied. Even though Samples No. 56 to No. 60 were kept in the floating state for 24 hours, the percent transmission was not substantially varried.

Tests No. 61 and No. 62

Each light controlling device was prepared by incorporating polyvinyl butyral at a ratio of 30 wt. % in the electrolyte layer in Sample No. 61 or incorporating polyacrylic acid at a ratio of 30 wt. % in Sample 62 in the basical structure of Sample 49.

Figure 61:
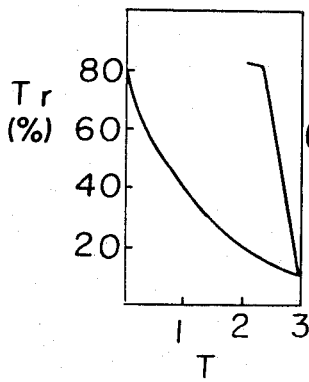
Figure 62:
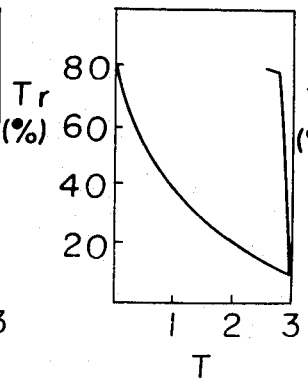

The coloring and bleaching characteristics are excellent as described in FIGS. 61 and 62. Moreover, Sample No. 61 and No. 62 had remarkably high durability without any liquid leakage because the electrolyte layer was in non-liquid form.

Tests No. 63 to No. 66

Figure 63:
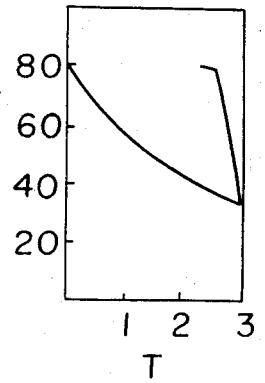
Figure 64:
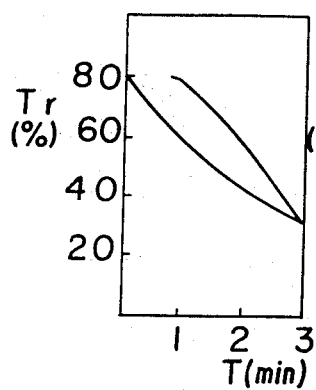
Figure 65:
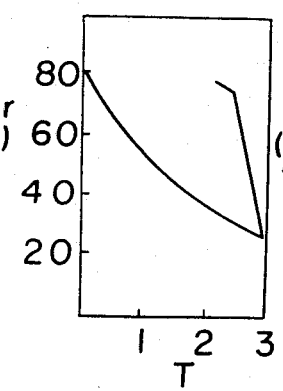
Figure 66:
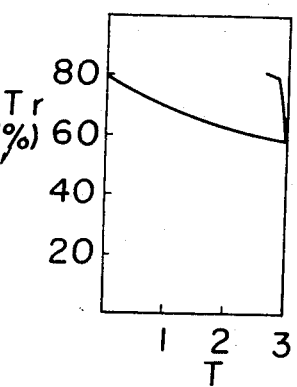

Each sample was prepared by forming a transition metal oxide layer on a counter electrode in the basic structure of Sample No. 49 except that each layer was made of FeO for Sample No. 63, NiO for Sample No. 64 or CuO for Sample No. 65 all at a thickness of 500 Å. When the voltage of 1 V was applied, the coloring and bleaching characteristics were the same as that of Sample No. 49. Thus, the coloring and bleaching characteristics were measured at the lower voltage of 0.75 V as a test of severe condition. The results are shown in FIGS. 63 to 65.

The driving voltage was 0.75 V, the coloring characteristics are slightly inferior to the data measured at 1 V. When the data of Sample No. 63 to 65 are compared with the data of Sample No. 66 having no transition metal oxide layer (this is the same as Sample No. 49 as a device), the low voltage actuation characteristics of Samples No. 63 to No. 65 are superior to that of Sample No. 66.

Tests No. 67 to No. 69

Figure 67:
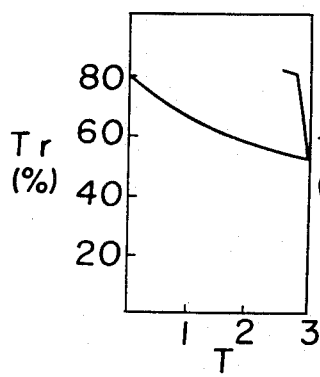
Figure 68:
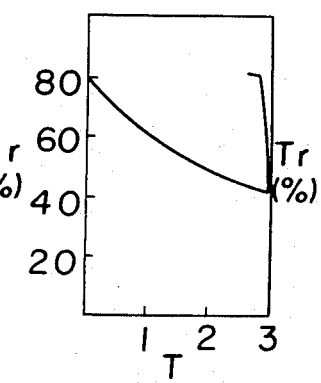
Figure 69:
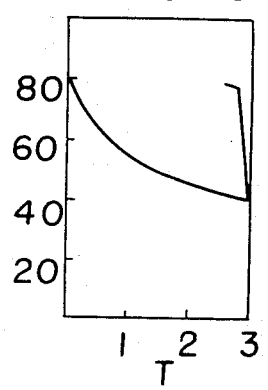
Figure 70:
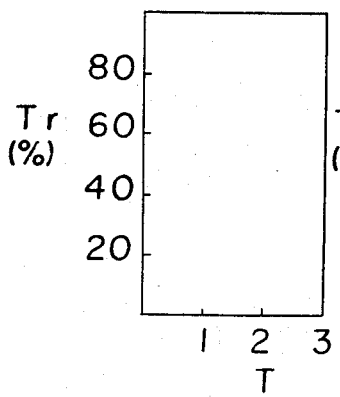
Figure 71:
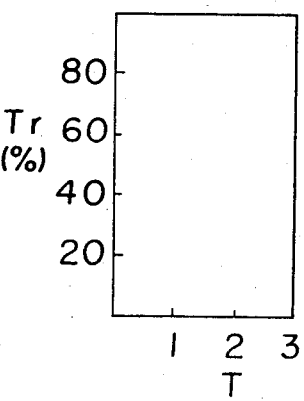
Figure 72:
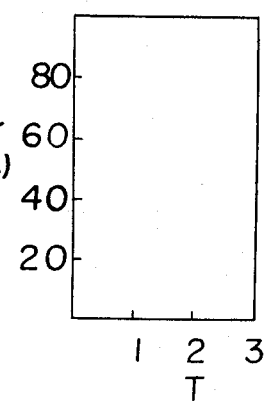

Each sample was prepared by incorporating LiClO₄ in Sample No. 67; LiBr in Sample No. 68 or H₂SO₄ in Sample No. 69 instead of the iodine compound and the coloring and bleaching characteristics of Samples No. 67 to No. 69 were measured. The results are shown FIGS. 67 to 69. The samples had unsatisfactory coloring characteristics.

In accordance with the present invention electro-optical devices having excellent coloring and bleaching characteristics can be obtained and especially electro-optical devices having excellent durability without any liquid leakage can be obtained by using a semisolid electrolyte layer using an adhesive or tacky high polymer. This device can be used for various light-controlling devices and can be applied for various fields by adding the other material or the additive if necessary.

We claim:

1. An electro-optical device comprising non-solid electrolyte layer held between a pair of electrodes and a solid electrochromic material placed on at least one of said electrodes, said electrolyte layer comprising an organic material and a chelating agent, wherein said electrolyte layer further comprises iodine or an iodine compound selected from the group consisting of metal or ammonium iodides, $C_1$-$C_4$ iodine-containing carboxylic acids, $C_1$-$C_4$ alkyl iodides and chromatic iodo compounds, in an amount of from $5\times10^{-3}$ mole/liter up to saturation level.

2. The electro-optical device according to claim 1 wherein said electrolyte layer comprises a bleaching stabilizer of a chlorine-containing lower carboxylic acid or a bromine compound.

3. The electro-optical device according to claim 1 wherein said chelating agent is a sulfur-containing compound.

4. An electro-optical light controlling device comprising a semi-solid electrolyte layer held between a pair of light-transmissive electrodes and a solid electrochromic material placed on at least one of said electrodes, said semi-solid electrolyte comprising an organic material and a compound having a coordination function to the metal of the electrode, a non-liquid adhesive high polymer whereby the electrolyte layer adheres to the electrodes, and iodine or an iodine compound selected from the group consisting of metal or ammonium iodides, $C_1$-$C_4$ iodine-containing carboxylic acids, $C_1$-$C_4$ alkyl iodides and aromatic iodo compounds, in an amount of from $5\times10^{-3}$ mole/liter up to saturation level.

5. The electro-optical light controlling device of claim 4, wherein said coordinating compound is a chelating agent.

6. The electro-optical light controlling device of claim 4, wherein said adhesive high polymer is a polyvinyl acetal resin.

7. The electro-optical device of claim 4, wherein said adhesive high polymer is a polyvinyl butyral resin.

8. The electro-optical light controlling device of claim 4, wherein said electrolyte layer further comprises a bleaching stabilizer of a chlorine-containing lower carboxylic acid or a bromine compound.

9. The electro-optical light controlling device of claim 4, wherein said chelating agent is a sulfur-containing material.

* * * * *